Aug. 2, 1955  E. LORENCE  2,714,452
ENDLESS CONVEYOR SIZER
Filed Oct. 19, 1951  3 Sheets-Sheet 1

INVENTOR
*Everett Lorence*
BY
ATTORNEYS

Aug. 2, 1955  E. LORENCE  2,714,452

ENDLESS CONVEYOR SIZER

Filed Oct. 19, 1951  3 Sheets-Sheet 2

INVENTOR
Everett Lorence

BY
ATTORNEYS

United States Patent Office 2,714,452
Patented Aug. 2, 1955

2,714,452
ENDLESS CONVEYOR SIZER

Everett Lorence, San Jose, Calif.

Application October 19, 1951, Serial No. 252,117

2 Claims. (Cl. 209—106)

The present invention is directed to, and it is a major object to provide, an endless conveyor sizer, of novel construction and function, which is operative to size fruit or the like progressively as such fruit moves on a traveling bed of rollers.

Another important object of this invention is to provide a fruit sizer which embodies a sizing bed comprised, in an endless conveyor, of a multiplicity of transverse rollers, all having a plurality of circumferential grooves therein alined in the direction of travel whereby adjacent and corresponding grooves define sizing openings for the passage of fruit of corresponding size downwardly therethrough from the upper run of the conveyor.

An additional object of the invention is to provide a fruit sizer, as above, wherein the transverse rollers include cross shafts, adjacent ones of which are connected at the ends by articulated linkage; there being guide means cooperating with said shafts, and linkages to cause the latter to assume a vertically zig-zag relation, with an acute included angle therebetween, adjacent the start of the upper run of the conveyor, with such included angle progressively increasing with forward advance until the linkages substantially straighten out at the finish of said upper run. The purpose of the above is to accomplish a progressive enlarging of the sizing openings, as defined by the grooved rollers, so as to obtain the desired progressive sizing of the fruit which passes downwardly through said openings.

It is also an object of this invention to provide an endless conveyor sizer for fruit or the like which functions continuously, smoothly, and with the accomplishment of accurate sizing of the fruit.

A further object of the invention is to provide an endless conveyor sizer for fruit or the like which is designed for ease and economy of manufacture, and long operational life, with a minimum of maintenance or repair being required.

Still another object of the invention is to provide a practical and reliable endless conveyor sizer for fruit, and one which is exceedingly effective for the purpose for which it is desired.

These objects are accomplished by means of such structure and relative arrangement of parts as will fully appear by a perusual of the following specification and claims.

Figure 1:
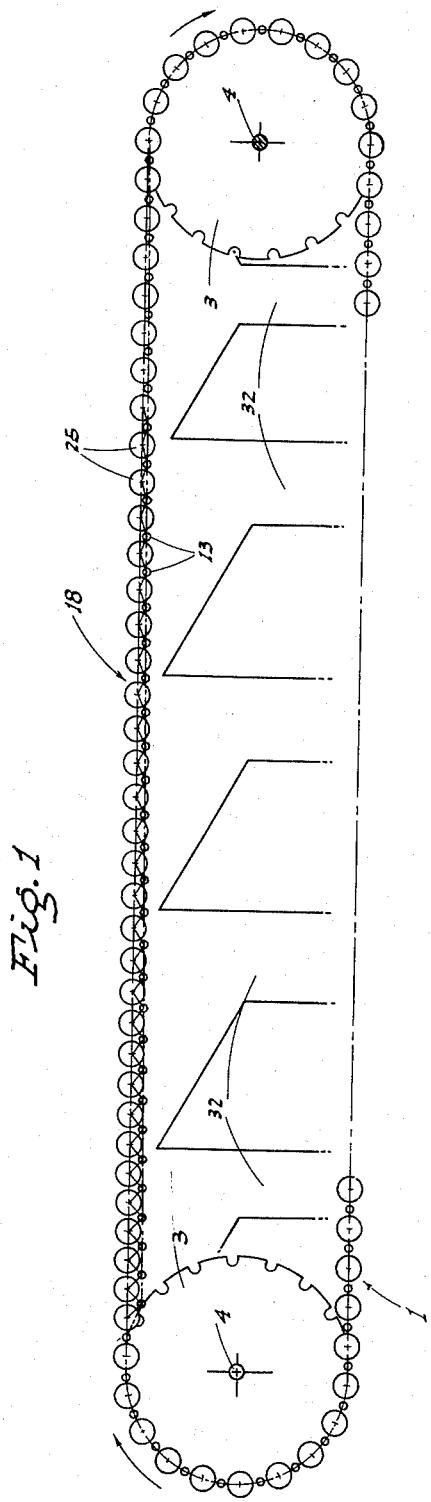
Fig. 1 is a diagrammatic side elevation of the endless conveyor sizer.
Figure 3:
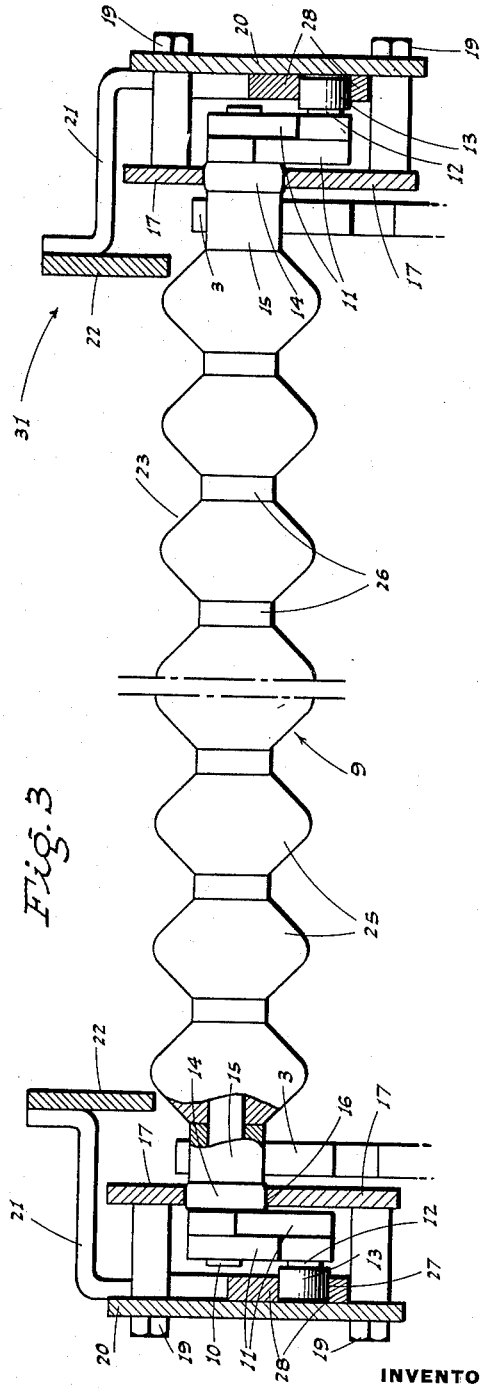
Fig. 3 is a cross section on line 3—3 of Fig. 2.
Figure 2:
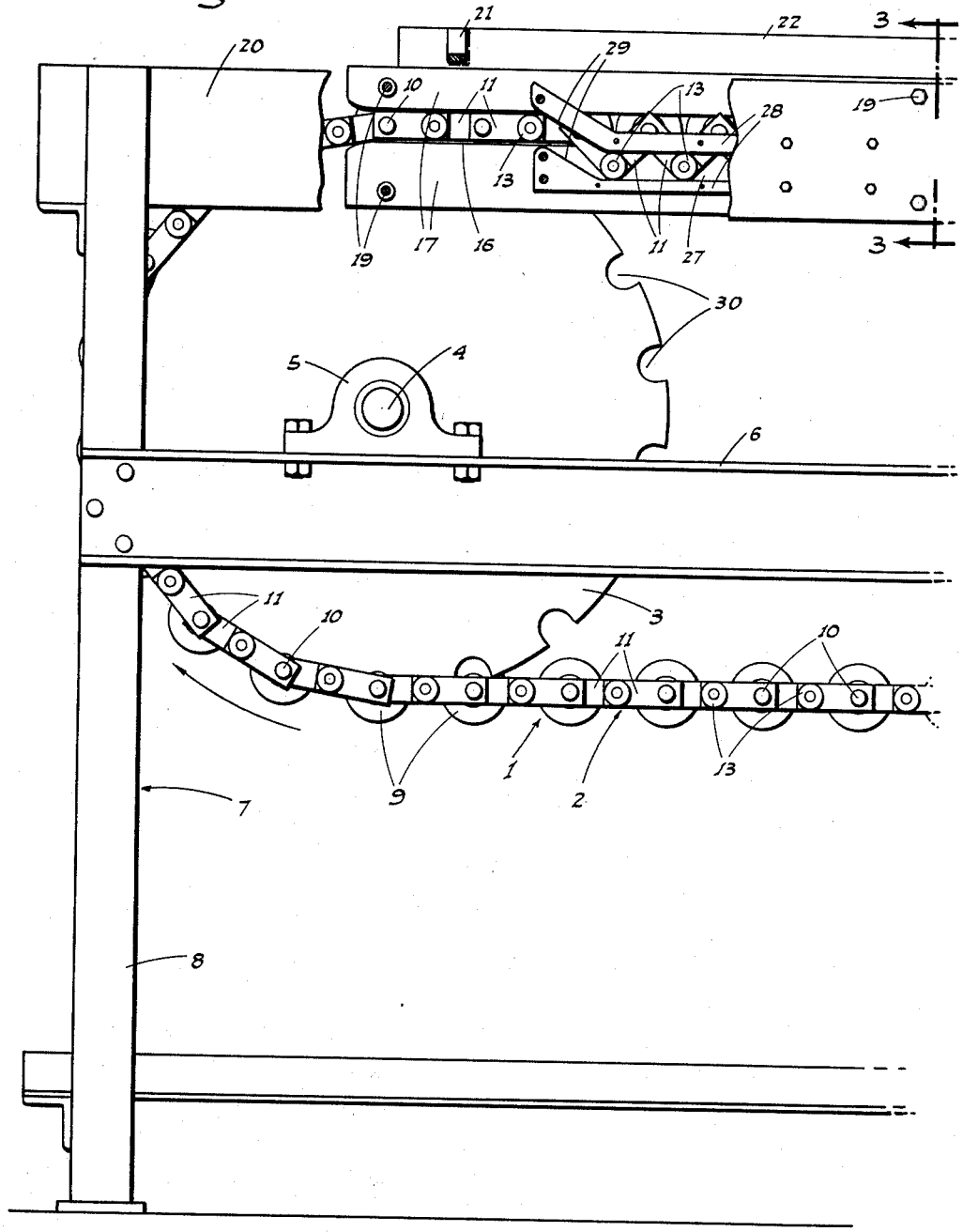
Fig. 2 is an enlarged fragmentary elevation taken at the feed-in end of the device.
Figure 4:
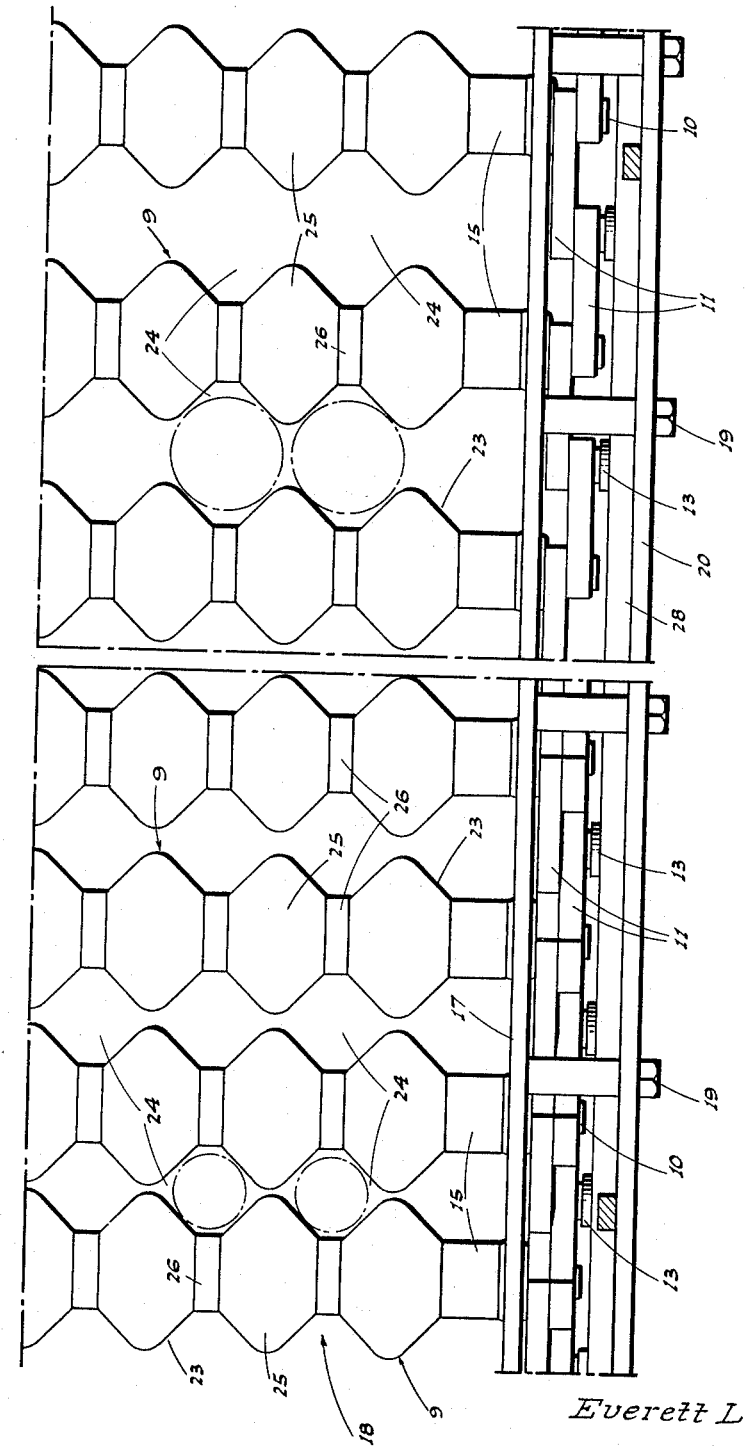
Fig. 4 is a fragmentary longitudinal plan view, foreshortened, showing mainly the opposite end portions of the sizing bed whereby to illustrate the progressive enlargement of the sizing openings.

Referring now more particularly to the characters of reference on the drawings, the sizer comprises a horizontal endless conveyor, indicated generally at 1, such conveyor including—at the sides—endless, link chains 2, hereinafter described in greater detail.

The endless conveyor 1 is trained, at the ends, about sprockets 3 on cross shafts 4 journaled, as at 5, in connection with longitudinal side beams 6 of the conveyor supporting frame; the latter being indicated generally at 7, and including legs 8.

The endless conveyor 1 includes, between the link chains 2, a multiplicity of elongated, transverse rollers 9 disposed in adjacent but spaced parallel relation.

The rollers 9 are turnably carried on cross shafts 10, whose outer ends are pivotally connected to adjacent ends of links 11 of the chains 2.

There is a pair of the links 11 extending between adjacent cross shafts 10, and the links of each such pair are connected at their adjacent ends by link pins 12 which project outwardly with a roller 13 on the projecting portion.

In other words, the links 11 of the chains 2 are pivotally connected, at adjacent ends, alternately by the cross shafts 10 and link pins 12.

Inwardly of the chains 2 the cross shafts 10 are fitted with rollers 14 and—axially inwardly of the latter—bearing sleeves 15 which form sprocket engaging rollers.

The rollers 14 on the cross shafts 10 ride—in the upper run of the endless conveyor 1—in the slot 16 of a longitudinal, horizontal guide track 17 whereby the upper run of said conveyor, which forms a fruit sizing bed—indicated generally at 18—, moves lengthwise in a straight horizontal path.

The guide track 17 is supported by stand-off bolts 19 from the adjacent longitudinal side plate 20 of the frame 7; such side plates also carrying overhanging brackets 21 which support longitudinal, fruit retention skirts 22 along opposite sides of the fruit sizing bed 18 for the full length thereof.

The elongated, transverse rollers 9 are each formed with a plurality of relatively deep circumferential grooves 23, here shown as of generally V-shape in cross section, but which may be substantially semi-circular as an alternate form.

The corresponding circumferential grooves 23 of the rollers 9 are all in alinement in the direction of travel, whereby adjacent ones of said corresponding grooves cooperatively define fruit sizing openings 24.

The rollers 9 may each be integral, with the grooves 23 machined therein, or said rollers may, as here shown, be made up of a plurality of separate tapered rollers 25 having spacing collars 26 therebetween on the cross shafts 10.

The row of rollers 13 along each of the endless link chains 2 on the outside thereof are engaged and run in the slot 27 of a longitudinal cam track 28 affixed to the adjacent side plate 20. Each longitudinal cam track 28 is formed, immediately adjacent the starting end of the upper run of the conveyor 1, with a sharply downwardly inclined entry 29, and thence such cam track—which is straight thereafter—inclines slowly upwardly in the direction of travel, whereby it converges on a very low angle with respect to the corresponding guide track 17 which carrier the rollers 14 on the cross shafts 10.

When the sizer is in operation the endless conveyor 1 travels about the sprockets 3, with the bearing sleeves 15 engaging in circumferentially spaced notches 30 in the periphery of said sprockets, one set of which is driven to impart the desired motion to the conveyor with its upper run traveling in the direction indicated by the arrows in Fig. 1.

At the start of the upper run of the endless conveyor 1, and as the rollers 13 are carried into the longitudinal cam track 28 by the sharply downwardly inclined entry 29, such rollers are shifted below the horizontal plane of the cross shafts 10, with the result that the pairs of links 11 are articulated to a position wherein they define an acute angle therebetween. In other words, the link chains 2 at the start of the upper run of the conveyor are disposed with a zig-zag configuration, vertically. Thereafter, as the upper run or fruit sizing bed 18 of the conveyor moves forwardly, such zig-zag relationship progressively becomes lesser; i. e. the included angle between the links 11 of the pairs progressively increases until such links are substantially alined at the finish of said upper run.

It will thus be recognized that as the pairs of links 11 progressively flatten out, the cross shafts 10, and consequently the rollers 9, likewise progressively increase in their spacing. Therefore, at the start of the upper run or fruit sizing bed 18, the sizing openings 24—as defined by the adjacent corresponding grooves 23—are relatively small but progressively increase in opening size as the conveyor moves forward. Although the size of the openings 24 progressively enlarges throughout the length of the upper run of the conveyor, such openings remain generally symmetrical.

With the foregoing progressive enlargement of the openings 24, fruit fed into the trough 31 defined by the skirts 22, and onto the upper run at the start thereof and turning or rolling on the rollers 9, escapes downwardly through the openings 24 at points in such run corresponding to larger and larger fruit size. The different sized fruit is received in separate catch bins 32 below the upper run or fruit sizing bed 18 of the conveyor, which catch bins 32 may include suitable carry-off conduits or chutes.

With the described endless conveyor sizer, fruit or the like of any type, which is generally rounded or which will roll, can be effectively, rapidly, and positively sized or graded; the device, by reason of the rolling action, handling the fruit without bruising or damage.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a sizer which includes a supporting frame, a driven endless horizontal conveyor arranged so that its upper run forms a sizing bed, and pairs of transversely spaced end sprockets mounted on the frame and supporting the conveyor at the ends of said run; the conveyor comprising link chains at the sides spaced laterally out from the sprockets and transverse sizing rollers between the chains, each chain including articulated linkage between adjacent rollers, each linkage comprising a pair of links, a cross shaft connecting the linkages at their adjacent ends and on which the rollers are turnable and pivot means connecting the links at their adjacent end; means cooperating with said articulated linkages in the upper run of the conveyor operative to progressively increase the space between the rollers as said run advances, said means including rollers turnable on the cross shaft between the sizing rollers and the chains and frame-supported guide means for said last named rollers, and other rollers on the cross shaft between the sizing rollers and said turnable rollers and engaging the sprockets, all the rollers being turnable on the cross shaft independently of each other.

2. In a sizer which includes a supporting frame, a driven endless horizontal conveyor arranged so that its upper run forms a sizing bed, and pairs of transversely spaced end sprockets mounted on the frame and supporting the conveyor at the ends of said run; the conveyor comprising link chains at the sides spaced laterally out from the sprockets and transverse sizing rollers between the chains, each chain including articulated linkage between adjacent rollers, each linkage comprising a pair of links, a cross shaft connecting the linkages of their adjacent ends and on which the rollers are turnable and pivot means connecting the links at their adjacent end; rollers on the pivot means outwardly of the linkage; the frame including longitudinal side plates disposed on edge and disposed in transverse planes between the linkages and the sprockets and having longitudinal slots, rollers on the cross shafts engaging in the slots, other rollers on the pivot means of the linkages outwardly thereof, other side plates disposed laterally out from said other rollers, means connecting the adjacent plates in cooperating relation, guide means for said other rollers mounted on the inner face of said other plates, and additional rollers on the cross shafts in position to engage the sprockets.

References Cited in the file of this patent

UNITED STATES PATENTS

| 1,302,002 | Boyer | Apr. 29, 1919 |
| 1,379,207 | O'Quinn | May 24, 1921 |
| 1,489,585 | Tinklepaugh | Apr. 8, 1924 |
| 2,467,651 | Balduf | Apr. 19, 1949 |

FOREIGN PATENTS

| 408,050 | Great Britain | Apr. 5, 1934 |
| 423,149 | Great Britain | Jan. 25, 1935 |